Oct. 29, 1963  C. M. JOHNSON  3,108,388
EARTH-MOVING MACHINE
Filed June 27, 1961  4 Sheets-Sheet 2

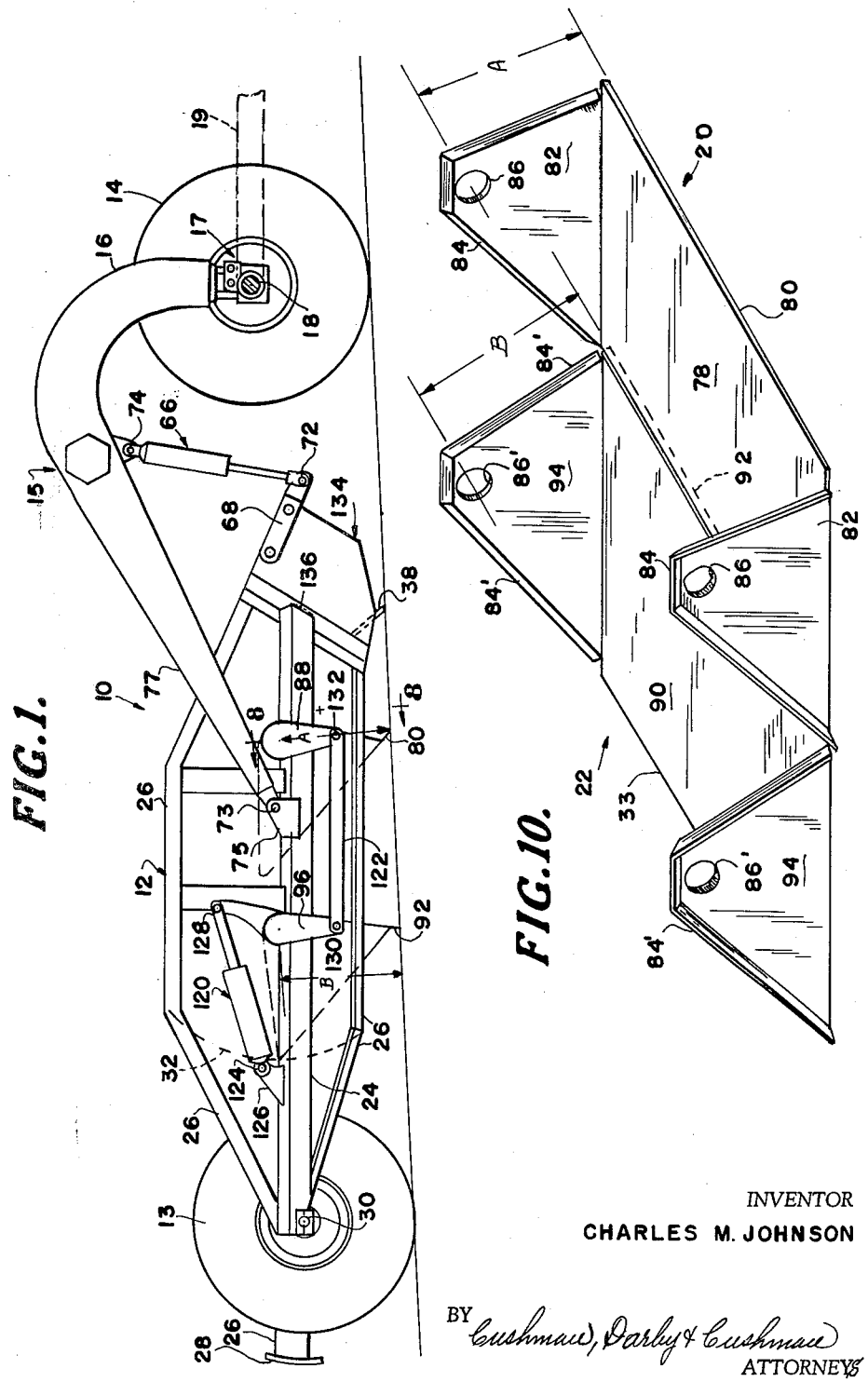

INVENTOR
CHARLES M. JOHNSON

BY Cushman, Darby & Cushman
ATTORNEYS

Oct. 29, 1963 C. M. JOHNSON 3,108,388
EARTH-MOVING MACHINE
Filed June 27, 1961 4 Sheets-Sheet 3

INVENTOR
CHARLES M. JOHNSON
BY Cushman, Darby & Cushman
ATTORNEYS

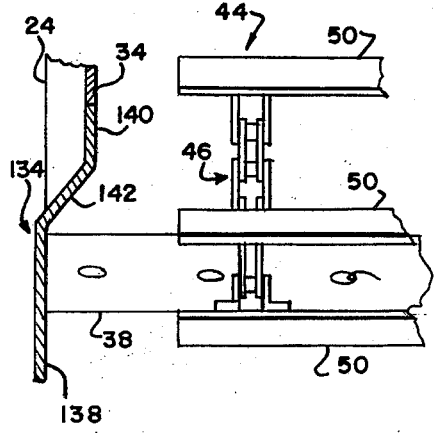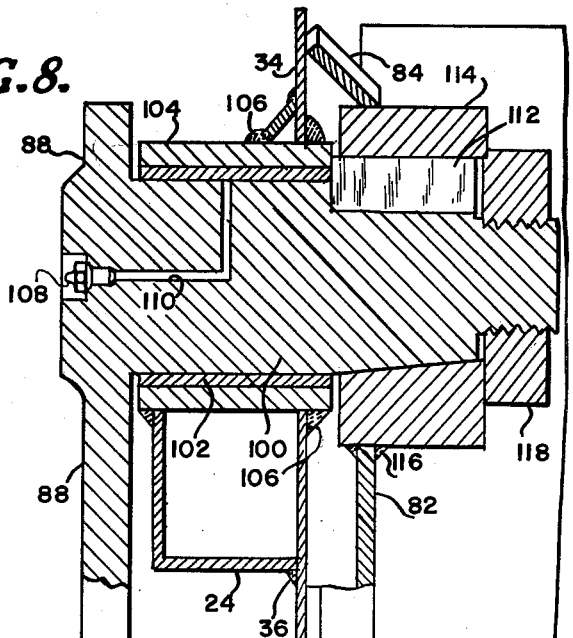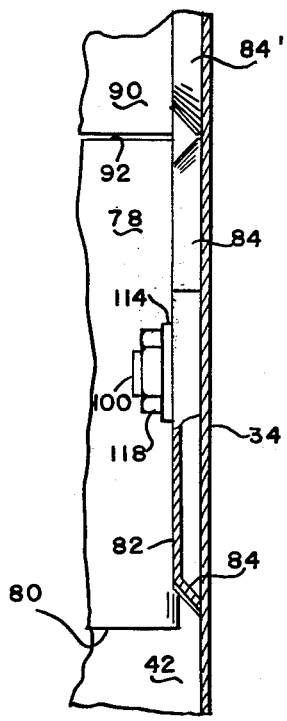

United States Patent Office 3,108,388
Patented Oct. 29, 1963

3,108,388
EARTH-MOVING MACHINE
Charles M. Johnson, Lubbock, Tex., assignor to Johnson Manufacturing Company, Lubbock, Tex., a corporation of Texas
Filed June 27, 1961, Ser. No. 119,857
10 Claims. (Cl. 37—126)

This invention relates to tractor propelled earth moving machines of the type which planes earth from the surface of the ground into pivoted buckets carried by the machine. In particular, it relates to improvements in the construction of the scraping and dumping elements in this type of earth moving machine whereby efficient and trouble-free operation is achieved.

The present invention embodies several improvements over known scraping and moving machines such as that disclosed in the applicant's copending application, Serial No. 692,766 filed October 28, 1957, now Patent No. 2,984,022. These known machines comprise a wheeled trailer or semi-trailer which can be connected to the rear of a tractor by a suitable coupling which conventionally includes a gooseneck pivoted at one end to the machine and at its other end to the tractor. A grader blade is mounted transversely to the axis of the machine along the lower forward edge of the machine and projects downwardly and forwardly for engagement with the surface of the ground when the forward end of the machine is lowered by suitable hydraulic pistons attached to the gooseneck. As the machine is moved along the ground behind the tractor, earth is planed from the surface of the ground and moves over the top surface of the grader blade into one or more buckets which have flat bottoms extending substantially the width of the bottom of the machine and positioned rearwardly of the grader blade between the sides of a frame which supports the machine. Side walls and a rear wall of the bucket form with the bottom wall an earth-retaining compartment. An endless scraper-type chain conveyor may be positioned above the bottom wall and grader blade along the axis of the machine for moving loosened earth back into the compartment. The side walls of the bucket are pivoted on the sides of the frame for rotation about an axis transverse to the machine so that the forward edge of the bottom wall may be lowered for dumping the collected earth. The forward edge of the bottom wall is also utilized as a ground scraping edge by lowering the forward end of the machine with the hydraulic pistons and pivoting the bucket with additional pistons to bring the forward edge of the bottom wall into contact with the ground. Conventionally, two buckets positioned one behind the other in the frame of the machine are utilized in a single machine.

Scraping and moving machines of the type described above suffer from several inefficiencies in their planing and dumping operations. One problem encountered is the inefficient moving of the earth by the conveyor lifts from the top of the grading blade into the forward bucket. Conventionally the lifts of the conveyor extend transversely of the machine but do not extend all the way to the inner surface of the vertical side walls of the frame because of the tendency of rocks and debris to become wedged between the side walls and the lifts. As a result of this construction, the movement of dirt past the side walls at the front of the machine is often slow and this results in a tendency for the dirt to stack up along the top of the grading blade. The improved construction embodied in the present invention overcomes this problem by providing flanges on the side walls of the frame near the grading blade which extend outwardly and forwardly so as to guide the loosened dirt inwardly where it will be rapidly carried away by the lifts of the conveyor.

Another problem which is encountered in these machines is the wedging of pebbles and debris between the sides of the buckets and the inner surface of the sides of the frame of the trailer, and when operating in wet dirt or freezing weather, the wedging of mud or ice in the same location. Conventionally, these machines are constructed with the bucket side walls and the frame side walls almost flush over the full extent of their outer and inner surfaces respectively. The wedging of pebbles, debris, mud or ice between these surfaces results in excessive bending of the bucket side walls and creates considerable resistance to movement of the buckets during a dumping operation. The present invention overcomes the difficulties by spacing the bucket side walls from the frame side walls and providing an outwardly extending flange on the exterior of the bucket side walls which extends to the inner surface of the frame side wall. The spacing permits rocks and debris which may come between the walls to sift out the bottom of the machine and the flanges provide a scraping action which cleans the frame side walls thereby facilitating movement of the buckets.

A further problem overcome by the present invention is the inability of the pivot structure to permit the bottom wall of the buckets to swing to a full vertical position during the dirt dumping operation. Mud and clay, having a tendency to stick to the bottom wall of the buckets, were often incompletely dumped because the bottom wall did not tilt to an angle at which the sticky material would free itself. In the improved construction of the present invention the lever arms and actuators therefor have been relocated so as to rotate the buckets 90° or more between closed and dump positions. A further improvement relating to the construction of the buckets permits the buckets to be rotated so that the forward edge of each bucket engages the surface of dumped earth to the same extent during a dumping and leveling operation.

It is therefore an object of the present invention to provide an earth scraping and moving machine which more effectively scrapes, loads and dumps earth than machines heretofore used for these purposes.

It is an object of the present invention to provide an earth scraping machine of the type having a conveyor for moving the loosened dirt into a bucket with guide means for directing the dirt away from the sides of the machine and toward the conveyor.

A further object of the present invention is to provide an earth scraping and moving machine having earth collecting buckets which prevent debris from wedging between the sides of the buckets and the remainder of the machine.

A further object of the invention is to provide an earth scraping and moving machine in which pivoted earth collecting buckets can be rotated to place their bottom walls in a vertical position for dumping their contents.

A further object of this invention is to provide an earth scrapping and moving machine in which the leveling work during a dumping and leveling operation and resulting stress in the scraping elements is equally distributed among a grading blade, forward bucket and rear bucket.

The invention will be more fully understood by reference to the following detailed description and drawings which disclose an illustrative embodiment of the invention.

In the drawings:

FIGURE 1 is a side elevational view of an earth scraping and moving machine embodying the principles of the present invention in which the buckets have been rotated to a position in which earth will be dumped and leveled;

FIGURE 7 is an enlarged fragmentary view, partly in section, of part of FIGURE 5;

FIGURE 8 is a sectional view on an enlarged scale taken on the line 8—8 of FIGURE 1;

FIGURE 9 is a fragmentary plan view partly in section of part of FIGURE 4;

FIGURE 10 is a perspective view of the front and rear buckets in the fully closed position.

Figure 5:
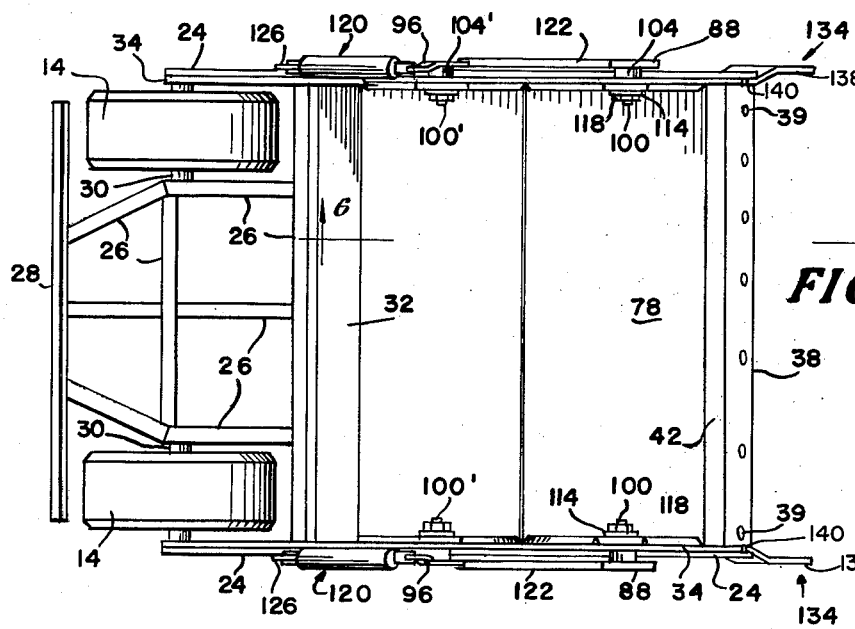
FIGURE 5 is a top plan view of FIGURE 4 with some parts removed.

Referring to the drawings, particularly FIGURE 1, there is shown therein a trailer-type earth moving machine 10, embodying the principles of the present invention, which includes an open front frame assembly 12, the rear end of which is supported by a pair of laterally spaced ground-engaging wheels 13 and the front end of which is supported from a pair of laterally spaced ground-engaging wheels 14 by means of a fork-like or wishbone-shaped member 15 having a stem portion 16 and a pair of arms straddling the frame assembly 12. The stem portion 16 of the member 15 is in the shape of a gooseneck having a fifth wheel arrangement, generally indicated at 17, mounting a transverse axle carried by the wheels 14. As seen in FIGURE 1, the wheel nearest the viewer and part of axle 18 have been removed in order to show the relative position of the coupling 17. Connected to the axle 18 is a draw bar 19, generally indicated in dotted lines, that may be connected to an appropriate prime mover (not shown), such as a tractor, for towing the machine. While a trailer-type machine has been illustrated, it should be understood that the principles of the invention are equally applicable to a semi-trailer-type machine in which the gooseneck portion 16 is supported at its forward end directly on the rear end, for example on the rear axle, of the prime mover by means of a suitable coupling.

Front and rear buckets, 20 and 22 respectively, are pivotally mounted for movement in a vertical plane within the frame assembly 12 on laterally spaced main beam members 24 which extend along each side of the machine. The main beam members 24 may be of any suitable construction such as angle iron or I-beams, and with secondary beam members 26 suitably connected by bolting or welding, form the frame assembly 12. At the rear of the machine, secondary beam members 26 are suitably interconnected to provide a support frame for a rear bumper 28 and for journaling axles 30 on which the wheels 13 rotate.

Figure 6:
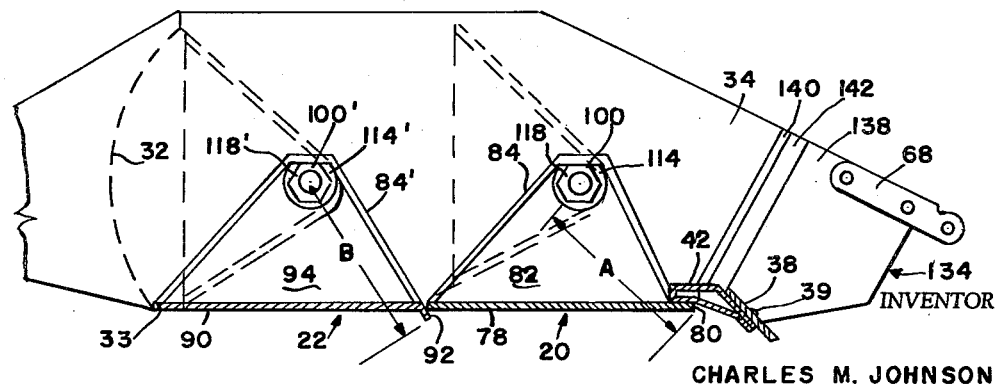
FIGURE 6 is a sectional view taken on the line 6—6 of FIGURE 5.

Within the frame assembly 12 are a rear wall 32 and a pair of parallel side walls 34 of metal plates or sheet metal suitably fastened to the beams 24 and 26, as by welds 36 (FIGURE 8). Rear wall 32 is concave rearwardly and is adapted to engage the trailing edge 33 of the rear bucket during pivoting movement of the bucket. The side walls 34 are flat plates of any convenient size and shape for laterally holding the earth that is scooped into the machine during a scraping operation. As seen in FIGURES 5, 6 and 10, buckets 20 and 22 are open front and back and when in the fully closed position form the bottom wall of an earth holding compartment which is defined rearwardly by rear wall 32 and laterally by side walls 34 and the side walls of the buckets. At the bottom front of the frame assembly 12 is a grader blade 38 rigidly mounted transversely between the sides of the assembly and extending downwardly and forwardly for engagement with the surface of the earth during a scraping operation. As seen in FIGURES 5 and 6, the grader blade 38 is mounted, as with bolts 39, on suitable support members 40 which extend transversely between the main beams 24 and which form a floor portion 42, the trailing edge of which is engaged by the top of the scraping edge of the front bucket 20 when in the fully closed position.

Figure 4:
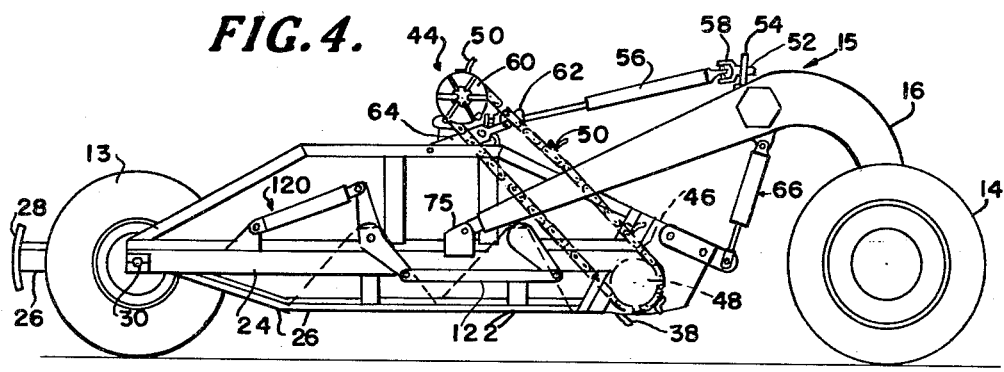
FIGURE 4 is a side elevational view of the machine in which the buckets are in the fully closed position and which is provided with a conveyor for aiding in the moving of earth rearwardly in the machine.

As seen in FIGURES 4 and 9, the earth moving machine 10 may be provided with a conveyor 44 for aiding in carrying loosened earth into the machine. Preferably the conveyor 44 is of the type disclosed in copending application Serial Number 692,766, filed October 28, 1957, which includes a pair of transversely spaced endless chains 46 trained over sprocket wheels 48 and transverse scraper bars 50 fastened near their ends to the chains 46. As fully described in the copending application, the conveyor 44 may be supported on a rigid longitudinal frame (not shown) which is pivoted at its upper end for rotation in a vertical plane about the axis of the upper sprocket wheels so that the lower end of the conveyor rests on the dirt being scraped into the machine by the grader blade 38. The conveyor 44 may be driven from a power take-off (not shown) of the towing prime mover (not shown). The drive train may include a shaft 52 connectable at one end to the power take-off and journalled on a bracket 54 mounted on the member 15, an extensible and contractable shaft 56 connecting with the other end of shaft 52 through a universal joint 58 and with a gear box 60 through another universal joint 62. The gear box, upper sprocket wheels and conveyor frame may be supported from the top of the frame assembly 12 by any suitable means such as arms 64.

The machine 10 includes a hydraulic cylinder and piston 66 for raising and lowering the forward end thereof. A forwardly extending lift arm 68 is attached as by bolts 70 to each side of the front of the machine and is provided with a pin 72 for pivoting the outer end of the piston. The cylinder is pivoted with a pin 74 to a lug 76 on the lower surface of the member 15. Any conventional means (not shown) for controlling the cylinder and piston 66 from the operator's seat in the towing prime mover may be provided. To permit pivotal movement between the member 15 and the machine 10, the rear end of each arm 77 of member 15 is suitably pivoted as by a pin 73 to a lug 75 secured to the main beam 24.

As indicated above, the buckets in the improved construction of the invention embody several novel features. As best seen in FIGURES 6, 7, 8 and 10, each of the buckets 20 and 22 is open to the front and rear and includes a pair of parallel side walls and a flat bottom wall.

The front bucket 20, as shown, consists of a rectangular bottom wall 78 having a forward earth-leveling edge 80 which extends forwardly of two vertical side walls 82. The shape of the side walls may conveniently be upwardly tapering with flattened tops as seen in FIGURE 10. Extending laterally from the front, top and rear edges of each side wall 82 is a continuous flange 84 formed in any convenient manner as by welding strips to the edges of the side walls. The flanges 84 extend from the side walls at any convenient angle, such as the obtuse angle apparent in FIGURE 7, and are adapted to engage the inner surface of the side walls 34 of the machine. Near the top of each side wall 82 is a hole 86 through which a bucket supporting arm 88 is mounted. The center of holes 86, and thus the axis of rotation of the front bucket, is a predetermined distance, A, from the leading surface of the leveling edge 80 of the bottom wall 78.

The rear bucket 22, as shown, consists of a rectangular bottom wall 90 having a downwardly and forwardly projecting leveling edge 92 and a pair of vertical side walls 94 which are similar to side walls 82 of the front bucket 20. A lateral flange 84′ extends from the front, top and rear edges of each side wall 94 and engages the inner surface of side walls 34 in the same manner as do flanges 84. Near the top of each side wall 94 is a hole 86', similar to holes 86 in side walls 82, for a support arm 96. The distance, B, from the axis of arm 96 to the leading surface of the leveling edge 92 of the bottom wall 90 is somewhat greater than the analogous distance, A, of front bucket 20.

Figure 3:
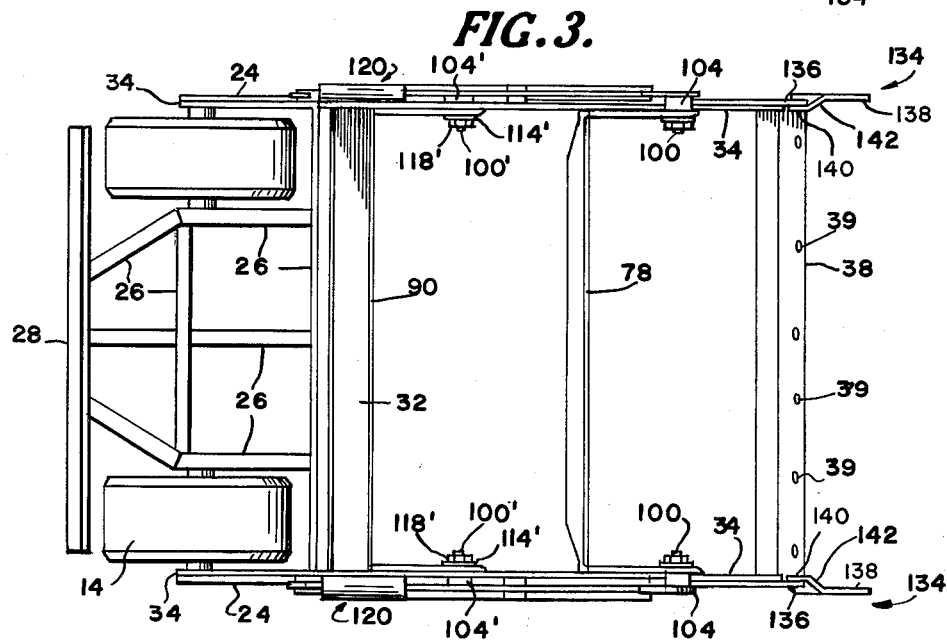
FIGURE 3 is a top plan view of FIGURE 2 with some parts removed.

The elements for mounting and moving the buckets 20 and 22 include front and rear arms 88 and 96, respectively, and hydraulic cylinders and pistons 120. As seen in FIGURE 8, each side wall 82 of the front bucket 20 is pivotally mounted by means of the arm 88 having a shaft 100 extending through one of the main beams 24 and through the side wall of the bucket. The shaft 88 is rotatable in a bushing 102 mounted in a housing 104 which is welded as at 106 or otherwise secured to main beam 24 and to the side wall 34 of the machine. A grease fitting 108 and grease passage 110 provide for lubrication of the bushing. Inwardly of side wall 34, the shaft 100 is keyed by key 112 to a sleeve 114 extending through hole 86 and welded to the edges thereof as at 116. A nut 118 threadedly engages the inner end of the shaft 100 for locking the shaft to the sleeve. The rear bucket 22 is similarly mounted for pivotal movement by arms 96 each of which has a shaft 100' cooperating with a housing 104', sleeve 114' and nut 118' as seen in FIGURES 1 and 3.

The elements which provide pivotal movement of the buckets 20 and 23 include a pair of hydraulic piston and cylinders 120 connecting with the arms 96 and a pair of bars 122 connecting the arms 96 with the arms 88. The end of each cylinder is pivoted by means of a pin 124 to a lug 126 secured as by welding to the main support beam 24 rearwardly of the shaft 100'. The outer end of the piston rod is pivoted by means of a pin 128 to the upper end of the rear arm 96. The connecting bar 122 is pivoted at its rear end by a pin 130 to the lower end of the arm 96 and at its front end by a pin 132 to the lower end of the front arm 88. The arrangement of shafts 100 and 100', arms 88 and 96 and pistons and cylinders 120 with respect to each other permits the buckets to be rotated 90° so that the bottom walls thereof may be moved to a vertical position.

As seen in FIGURES 1, 6 and 9, the improved construction also includes a pair of flanges 134 located at the forward end of the machine and extending forwardly and outwardly from a position rearwardly of the grader blade 38 for directing dirt toward the center of the machine. The flanges may be fastened in any suitable manner to the frame assembly as by welding to the main beams 24 as at 136 and to members 40. Each flange may be a single sheet of metal having parallel front and rear portions, 138 and 140, respectively, offset by an intermediate portion 142. The longitudinal position of the flanges, the angle between the intermediate portion 142 and the end portions 138 and 140 and the amount of offset between the end portions may be varied, it being desired only that the intermediate portion 142 be positioned rearwardly of the scraper blade 38 so as to engage incoming dirt and direct it inwardly toward the conveyor 44.

In operation, the machine 10 is propelled along the ground by the prime mover (not shown) whose operator also controls the vertical position of the front of the machine and the rotational position of the buckets 20 and 22 by means of the cylinders and pistons 66 and 120, respectively.

To effect a scraping, or digging, operation the buckets 20 and 22 are rotated counter clockwise as viewed in the drawings to their fully closed position (FIGURES 4 and 6) by extending cylinders and pistons 120, the forward end of the machine is lowered by extending cylinder and piston 66 until the grader blade 38 engages the ground and the machine is towed forwardly by the prime mover. Earth scraped from the surface of the ground by the grader blade 38 passes rearwardly over the blade and is urged toward the rear of the machine by the action of the conveyor scraper bars 50 which move clockwise as viewed in FIGURE 4. Loosened earth passing over the ends of the grader blade will be urged toward the center line of the machine by the intermediate portions 142 of flanges 134 where it too will be scraped rearwardly by the conveyor. When in the fully closed position, the bucket bottom walls 78 and 90 engage each other along their opposed edges and form the bottom of a dirt retaining compartment. The bucket side walls 82 and 94 and the machine side walls 34 form the sides of the compartment and the machine rear wall 32 forms the rear of the compartment.

Figure 2:
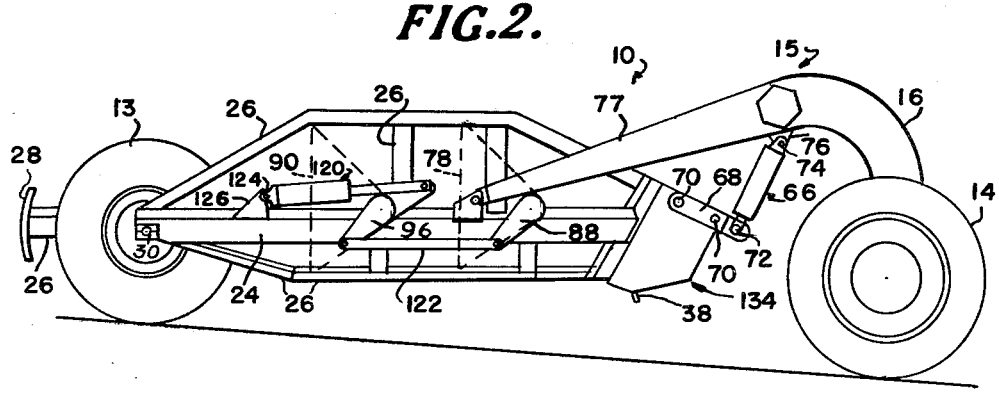
FIGURE 2 is a side elevational view of the machine of FIGURE 1 showing the buckets rotated to a full dump position.

When the earth retaining compartment of the machine has been filled with dirt or when it is desired to transport the scraped dirt to another location, the operator of the prime mover raises the grader blade 38 from the surface of the ground by contacting cylinder and piston 66 while maintaining the buckets 20 and 22 closed. The machine is then freely movable over the ground to any desired location. Dumping of the dirt may then be effected by rotating the buckets 20 and 22 clockwise from the closed position shown in FIGURE 4. To dump the entire contents at one time the buckets will be rotated 90° to the full dump position in which the bottoms walls become substantially perpendicular to the ground as seen in FIGURE 2. The pile of loose dirt thus formed or any other accumulation of loose dirt may then be leveled or spread out over the ground to any desired thickness by rotating the buckets to a position intermediate the closed and full dump position, as seen in FIGURE 1, and by towing the machine forwardly over the loosened dirt. During this movement of the machine the grader blade 38 and the leveling edges 80 and 92 of the buckets engage the loosened earth and spread it out in a layer the thickness of which depends on the vertical position of the front of the machine as determined by cylinder and piston 66 and on the rotational position of the buckets. Alternatively, the contents of the machine may be dumped and leveled simultaneously by rotating the buckets from the closed position to the intermediate position shown in FIGURE 1 and by towing the machine forwardly. During movement of the machine over the ground, the dirt within the earth-retaining compartment gradually slides forwardly down the inclined bottom walls of the buckets and is deposited in a layer the thickness of which is determined, as before, by the height of the leveling edges 80 and 92.

During the pivotal movement of the buckets 20 and 22, the flanges 84 and 84', respectively, slide along the inner surfaces of the side walls 34 of the machine and scrape from them any debris such as mud, ice and rocks which may have accumulated thereon during operation. During movement of the buckets, the debris which may have accumulated on the side walls 34 outside the flanges 84 and 84' will be loosened and will fall into the buckets or out the bottom of the machine, depending on the position of the buckets, and thus will be prevented from entering and lodging in the spaces between the side walls 34 of the machine and the side walls 82 and 94 of the buckets. This is a desirable feature because the presence of debris, particularly rocks in these spaces, tend to jam the buckets and to bend their side walls 82 and 94. Any debris that may have accumulated on the walls 34 inside the flanges, i.e., in the spaces defined by the walls 34, the walls 82 and 94 and the flanges 84 and 84', will be freed by the flanges during movement of the buckets and will drop out the bottom of the machine through the openings defined by the lower edges of the side walls 34 and the edges of bucket bottom walls 78 and 90.

Additionally, during movement of the buckets, dirt will be scraped from the rear wall 32 of the dirt retaining compartment. As best seen in FIGURE 6, the rear wall 32 is concave and is continually engaged by the trailing edge 33 of bottom wall 90 of the rear bucket 22.

This feature, together with the open-back construction of the rear bucket, assures that, during movement of the buckets from the closed position to a dumping position, dirt will not cling to the rear wall 32 but will be loosened so as to fall into the bucket and finally out the bottom of the machine. This feature is particularly desirable when operating in wet dirt and mud which have a tendency to become sticky and to accumulate even on vertical surfaces.

The improved construction for the buckets 20 and 22 in the present invention also results in the equalization of the leveling work between the buckets and the grader blade 38. As described above, the buckets are rotated simultaneously and to the same extent by the cylinders and pistons 120 and the connecting bars 122. If the distance between the scraping edge and the axis of rotation were the same in each bucket, it is apparent that the leveling edge 80 of the front bucket 20 would dig deeper into the loosened earth than would the leveling edge 92 of rear bucket 22 when the front of the machine is lowered to a leveling position by cylinders and pistons 66. This characteristic, which would result in excessive stresses in the front bucket, is overcome in the present invention by predetermining the distance between the pivot axis and the leveling edge of each bucket so that each leveling edge engages the ground to substantially the same extent when the forward end of the machine is lowered. In the machine illustrated in the drawings, the plane of the axes of the buckets and the plane of the bottom walls 78 and 90 are parallel when the buckets are in the closed position, i.e., the distance between each axis and its respective bottom wall is the same for each bucket. However, the distance, B, from the leveling edge 92 of the rear bucket 22 to its axis is greater than the corresponding distance, A, from the leveling edge 80 of the front bucket 20 to its respective axis. Thus, as seen in FIGURE 1, when the machine is lowered to a leveling position and the buckets are partially rotated from the closed position, the edges 92 and 80 engage the loosened earth to the same extent, i.e., the edges 92 and 80 become parallel to the ground at their leveling position. Preferably, as seen in FIGURE 1, the edges 92 and 80 will also engage the loosened earth to the same extent as the grader blade 38 so that the work of leveling is equally distributed among edges 92, 80 and 38. The numerical values for the dimensions A and B and, in particular, the difference between them, will vary depending on the design of the machine, such as the height of the axle 30 above the ground and the extent to which the cylinders and pistons can rotate the machine about the axle 30.

A further improvement in operation achieved with the present operation is the efficient movement of earth rearwardly into the machine during a scraping operation by means of the flanges 134 in combination with the conveyor 44. Referring to FIGURE 9, it can readily be seen that dirt passing over the grader blade 38 near the ends thereof (toward the top of the drawing, as viewed in FIGURE 9) will engage the intermediate portion 142 of the flange 134 and be directed inwardly toward the center of the machine where it will be dragged by the scraper bars 50 of the conveyor into the dirt retaining compartment. During operation, the chain 46 and attached scraper bars 50 of the conveyor move toward the bottom of the drawing, as viewed in FIGURE 9, and clockwise, as viewed in FIGURE 4.

Thus, it will be appreciated that the improved construction for earth scraping and moving machines, as described and illustrated, achieves more efficient and trouble-free operation than prior machines. During a digging, or scraping operation, the flanges on the front of the machine not only prevent the accumulation of debris along the side walls and consequent jamming and injury to the conveyor but also direct most of the dirt toward the conveyor for more efficient removal thereof toward the rear of the machine. Also, during a leveling operation, the improved bucket construction divides the leveling work evenly among the bucket edges and grader blade edge. During a dumping operation, the improved flanged bucket construction prevents damage to the bucket side walls by scraping and removing debris which would otherwise interfere with movement of the buckets.

While a preferred form of the invention has been disclosed, the invention is not to be construed as limited to the specific details illustrated and described, except as included in the appended claims.

What is claimed is:

1. In an earth-moving apparatus: a frame assembly having a front, rear and spaced sides; at least one ground-engaging wheel positioned toward the rear of said frame assembly for supporting the rear of said frame; means positioned toward the front of said frame assembly and extending forwardly thereof and supported by at least one forward ground-engaging wheel, said means including adjusting means for rotating said frame about a horizontal axis transverse to said frame assembly so as to adjust and maintain the front of said frame assembly at desired vertical positions above the ground; a plurality of earth-leveling members mounted within said frame assembly from front to rear, each of said leveling members having a leveling edge facing forwardly; means pivoting each of said leveling members to said frame assembly for movement in a vertical plane whereby each of said leveling edges is movable to a ground-engaging position in which said leveling edges are in the plane defined by the bottom of said forward and rear wheels, the distance between the pivot axis of each leveling member and its respective leveling edge being greater than that of the next forward leveling member whereby each leveling edge will dig into loosened earth on the ground to the same extent when said forward end of said frame assembly is lowered and when said leveling members are pivoted toward the ground, thus evenly distributing the leveling work among the scraping members.

2. An earth-moving machine, as in claim 1 in which each of said leveling members includes an open-front bucket having a bottom wall, the front edge of said bottom wall forming said leveling edge.

3. An earth moving machine as in claim 1 further comprising a fixed grading blade positioned transversely to the frame near the forward end thereof, said grading blade having a scraping edge adapted to dig into loosened earth to the same extent as the leveling edges of said pivoted leveling members when said forward end of said frame assembly is lowered.

4. An earth-scraping machine comprising: a frame having a front end and a rear end; spaced generally flat side walls mounted within said frame; at least one earth-receiving member between said side walls, said earth-receiving member including a bottom wall and side members spaced inwardly from and generally parallel to said side walls; means for pivoting said earth-receiving member for movement in a vertical plane; and means fixed to the side members of said earth-receiving member and extending to engagement with the adjacent surface of their respective side walls for scraping said side walls during movement of said earth-receiving member.

5. An earth-scraping machine, as in claim 4, wherein said means for scraping the surface of said side walls include flange means extending from the edges of said side members into engagement with said side walls.

6. An earth-scraping machine, as in claim 5 further comprising: a rear wall within said frame, said rear wall being concave and positioned so as to be scraped by the rear edge of the bottom wall of said earth-receiving member during movement of said member.

7. An earth-scraping machine, as in claim 5, wherein said flange means is continuous along the edges of said side members.

8. An earth-scraping machine, as in claim 7, in which said earth-receiving member is an open-front compartment, said bottom wall forming the bottom of said compartment and said side members forming the sides of said compartment.

9. In an earth-scraping and moving machine which includes a frame assembly having an open front, a rear and sides and a plurality of open-front earth-receiving buckets pivoted between said sides for movement in a vertical plane, said buckets being positioned one behind another, the improved construction comprising: side walls supported by said frame assembly between said buckets and said frame assembly; side members forming sides of said buckets and spaced from said side walls; scraping means fixed on said side members for scraping said side walls during movement of said buckets; bottom members forming the bottoms of said buckets and having front edges adapted to engage the ground in preselected positions of said buckets, the distance between the pivot axis and the front edge of each compartment being greater than that of the next forward bucket.

10. An earth-scraping and moving machine comprising: a frame assembly including a pair of laterally spaced, generally horizontal elongated side support beams and a generally vertical side wall fixed with respect to each beam; a plurality of earth-receiving buckets positioned one behind another between said support beams, said buckets including a bottom wall and a pair of side walls, said bucket side walls being pivoted to said main beams by means of arms which are parallel to said bucket side walls and outwardly spaced from said main beams and from said frame assembly side walls, said arms having shafts extending through said beams and connected to said bucket side walls; connecting rod means outwardly of said main beams and said frame assembly side walls and connecting said arms; and extensible means pivoted at one end to one of said arms and pivotally fixed at the other end whereby said buckets may be pivoted in a vertical plane so as to move said bucket bottom walls between a substantially horizontal position and a substantially vertical position.

References Cited in the file of this patent

UNITED STATES PATENTS

| | | |
|---|---|---|
| 1,090,034 | Dodge | Mar. 10, 1914 |
| 1,258,238 | Mougin | Mar. 5, 1918 |
| 2,207,424 | Wood | July 9, 1940 |
| 2,306,066 | Le Bleu | Dec. 22, 1942 |
| 2,330,113 | Daniels | Sept. 21, 1943 |
| 2,348,910 | Kadz | May 16, 1944 |
| 2,473,774 | Zakel | June 21, 1949 |
| 2,681,516 | Bourne | June 22, 1954 |
| 2,791,041 | Hancock | May 7, 1957 |
| 2,795,872 | Wardle | June 18, 1957 |
| 2,956,353 | Hanner et al. | Oct. 18, 1960 |
| 2,984,022 | Johnson | May 16, 1961 |

FOREIGN PATENTS

| | | |
|---|---|---|
| 1,068,149 | France | Feb. 3, 1954 |